(12) United States Patent
Epstein

(10) Patent No.: US 7,871,050 B2
(45) Date of Patent: Jan. 18, 2011

(54) ADJUSTABLE TRAY ASSEMBLY FOR HOLDING BEVERAGE CONTAINERS AND OTHER ITEMS

(76) Inventor: Marc I. Epstein, 200 E. 94th St., Ste. 603, New York, NY (US) 10128

( * ) Notice: Subject to any disclaimer, the term of this patent is extended or adjusted under 35 U.S.C. 154(b) by 120 days.

(21) Appl. No.: 11/607,561

(22) Filed: Nov. 30, 2006

(65) Prior Publication Data

US 2008/0128572 A1    Jun. 5, 2008

(51) Int. Cl.
*A47K 1/08* (2006.01)
(52) U.S. Cl. ............... 248/311.2; 206/217; 206/562; 224/544
(58) Field of Classification Search ............ 248/311.2, 248/310; 108/25, 26, 44, 45; 206/549, 562, 206/564, 217; 224/544, 483
See application file for complete search history.

(56) References Cited

U.S. PATENT DOCUMENTS

| | | | |
|---|---|---|---|
| 1,282,656 A | 10/1918 | Tiede | |
| 1,544,972 A | 7/1925 | Gebelein | |
| 1,757,689 A | 5/1930 | Strickland | |
| 2,801,066 A | 7/1957 | Clare | |
| 3,162,344 A | 12/1964 | Sabol | |
| 3,498,470 A | 3/1970 | Thomas | |
| 4,863,134 A | 9/1989 | Young et al. | |
| 4,967,988 A * | 11/1990 | Nguyen | 248/150 |
| 5,018,633 A | 5/1991 | Toth et al. | |
| 5,088,673 A * | 2/1992 | Chandler | 248/311.2 |
| 5,118,063 A | 6/1992 | Young, Sr. | |
| 5,205,473 A | 4/1993 | Coffin, Sr. | |
| 5,651,523 A | 7/1997 | Bridges | |
| 5,695,052 A * | 12/1997 | Damato | 206/217 |
| 5,960,982 A | 10/1999 | Perlis et al. | |
| 6,109,580 A | 8/2000 | Stern et al. | |
| 6,315,153 B1 | 11/2001 | Osborn | |
| D458,084 S * | 6/2002 | Hudson | D7/553.4 |
| 6,513,676 B2 | 2/2003 | Clemmons | |
| 6,533,233 B2 | 3/2003 | Thomas | |
| 6,651,836 B1 * | 11/2003 | Hofheins et al. | 220/575 |
| 6,732,990 B2 | 5/2004 | Hudson | |
| 6,971,618 B2 | 12/2005 | Moyer | |
| 6,988,614 B2 * | 1/2006 | Hemingway et al. | 206/217 |
| 7,198,327 B2 * | 4/2007 | Bergin | 297/188.18 |
| 7,243,991 B2 * | 7/2007 | Ojeda | 297/188.14 |
| 2002/0185578 A1 | 12/2002 | Hudson | |
| 2003/0141424 A1 | 7/2003 | Thomas | |
| 2004/0021050 A1 | 2/2004 | Izume | |
| 2005/0145533 A1 * | 7/2005 | Seligson | 206/575 |
| 2005/0167478 A1 * | 8/2005 | Holley et al. | 229/117.13 |
| 2006/0214075 A1 * | 9/2006 | Cassettari et al. | 248/311.2 |
| 2008/0011926 A1 | 1/2008 | Cappellino | |

* cited by examiner

*Primary Examiner*—Ramon O Ramirez
(74) *Attorney, Agent, or Firm*—William E. Pelton, Esq.; Cooper & Dunham LLP

(57) ABSTRACT

An adjustable tray assembly for engaging a cupholder in a vehicle comprises a tray having a plurality of cuts to form an aperture; and a frustum adapter having a downwardly tapered cylindrical shape, wherein the frustum adapter defines a first cavity for removably receiving an inserted beverage container, and wherein the adapter is removably inserted in the aperture and in the cupholder to bind the tray in place, and wherein the tray is substantially perpendicular with respect to a central axis of the cupholder and is capable of supporting various items, including food items.

11 Claims, 17 Drawing Sheets

ADJUSTABLE TRAY ASSEMBLY FOR HOLDING BEVERAGE CONTAINERS AND OTHER ITEMS

BACKGROUND

More and more people in the United States are eating meals and snacks in their cars. Not too long ago, only certain vehicles were equipped with cupholders, which were considered luxury items. For cars without cupholders, the owner who wanted a cupholder had to purchase a removable cupholder from the auto parts store. Such a cupholder attached to the inside door panel, where the car window was mounted. Nowadays, however, cupholders are standard features in cars and other vehicles. Thus, the market for removable cupholders has diminished. When it comes to original, factory-installed equipment, there are basically two types of cupholders in vehicles. The first is the standard well-type cupholder 101, which generally consists of one or two cavities 103 molded in a plastic base which is mounted in various areas of the car—in the console between the two front seats, for example. Such well cupholders have sidewalls 104 and bottoms 105 which encapsulate the inserted portion of the cup or other container, as shown in FIG. 1. The standard diameters of such well-type cupholders range from 2.75 inches to 4.0 inches. Some well-type cupholders may have an adjoining compartment 102 for holding various items, such as cassettes, pens, coins, etc.

Another type of installed cupholder is a dashboard disc which is usually mounted in the dashboard 110, and consists of a generally flat support piece 109 which slides in and out of the dashboard 110 and includes one or two circular cut-outs or holes 108 for receiving cups or other cylindrical containers, as shown in FIG. 2. The dashboard disc does not include a well with sides and a bottom for encapsulating the inserted beverage container, but rather consists of holes for receiving the container. The standard diameters of such dashboard disc cupholders range from 2.50 inches to 3.75 inches, and, thus, the dashboard disc cupholder tends to be smaller than the console-well cupholder.

The vehicular cupholders heretofore have been intended solely to hold cups or other beverage or snack food containers. However, as the population consumes more food products in the car (which are not housed in beverage shaped containers), it has become desirable to have a tray for holding such food items in the car. Food trays which make use of cupholders for support have been proposed in the past, but such items have not been adaptable to many cupholders and have been costly and bulky, which has precluded successful and significant market penetration. See, e.g., U.S. Pat. Nos. 6,109,580; 6,533,233; 6,732,990; and 6,808,097.

Accordingly, it is desired to provide an economical, convenient tray assembly, which is preferably made of renewable, recyclable and/or biodegradable material, is inexpensive to manufacture, and is compatible with different vehicle cupholders and nearby equipment, such as gearshifts and steering wheels.

SUMMARY OF THE INVENTION

An adjustable tray assembly is provided which includes a flat tray with an adjustable aperture formed of downwardly folding flaps for receiving a removably inserted, downwardly tapered frustum cylindrical adjustable adapter. The adapter may be inserted in virtually all standard cupholders of a vehicle for holding a beverage container and for supporting trays of different sizes and/or shapes, which may be used for keeping food items at hand. The adapter and/or aperture may be adjustable to meet the needs of different type and size cupholders in different vehicles and/or different beverage containers. The adjustable tray assembly may be reusable or disposable, and may be inexpensively manufactured. Paperboard is one of the preferred materials for the adjustable tray assembly, because its inexpensive cost and malleability facilitate economical manufacture. Molded and/or thermoformed plastic is another preferred material for one or both components of the tray assembly for reusability with or without disposable fitted paper placemats affixed to the tray top.

DETAILED DESCRIPTION

The present invention is described below with several embodiments of preferred paperboard for illustration only. Various other materials and modification of particular embodiments are within the spirit and scope of the present invention, as defined in the appended claims, will be apparent to those skilled in the art.

Figure 1:
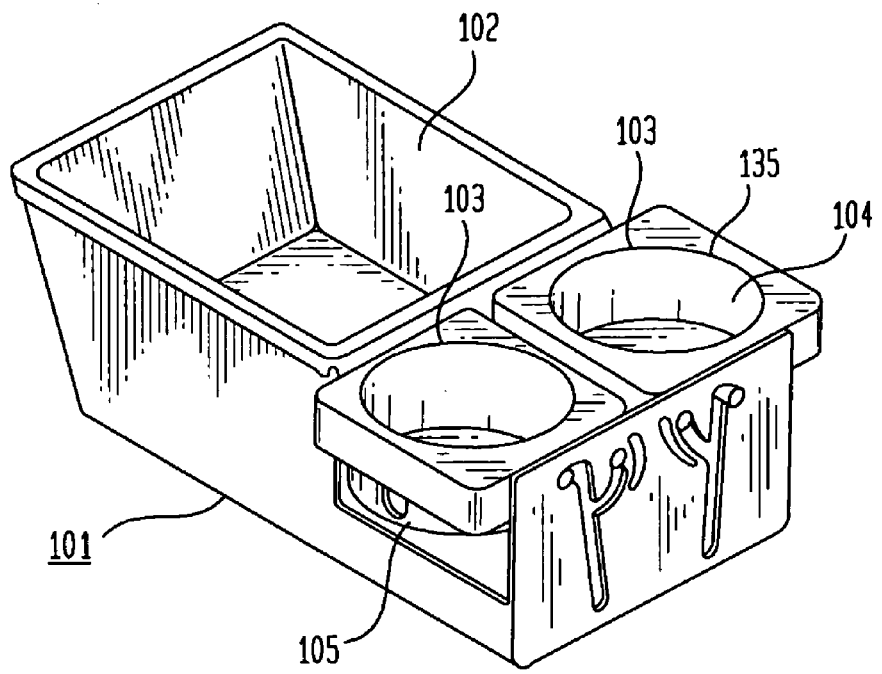
FIG. 1 is a perspective view of a well-type cupholder.
Figure 2:
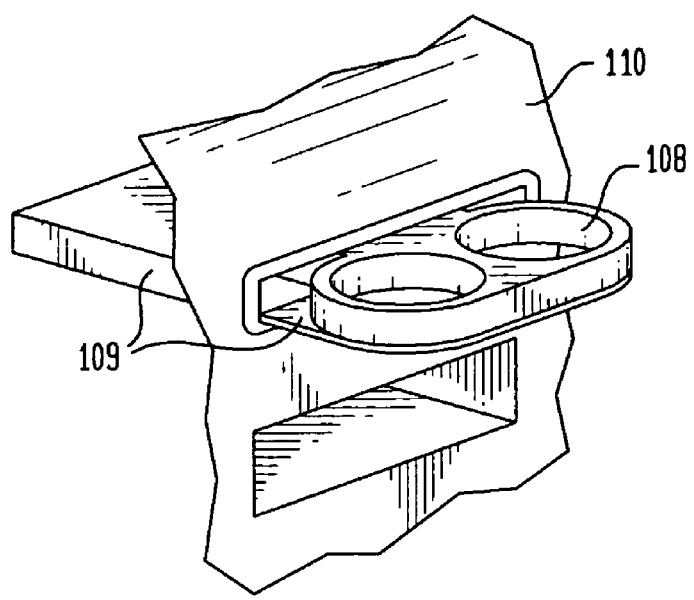
FIG. 2 is a perspective view of a dashboard cupholder.

The present invention relates to an apparatus that may be used in the typical cupholders found in many vehicles, such as those shown in FIGS. 1 and 2. The apparatus includes a tray for holding food items or other items, as well as an adapter for connecting the tray to the cupholder and holding a cup or other beverage container. The tray and adapter together form the tray assembly. The tray assembly may be constructed from an inexpensive material, such as paperboard and/or plastic, and may be disposable, recyclable or reusable. The tray assembly may be adjustable and may be constructed of two pieces, a flat tray and a cylindrical adapter, as described herein.

Figure 3:
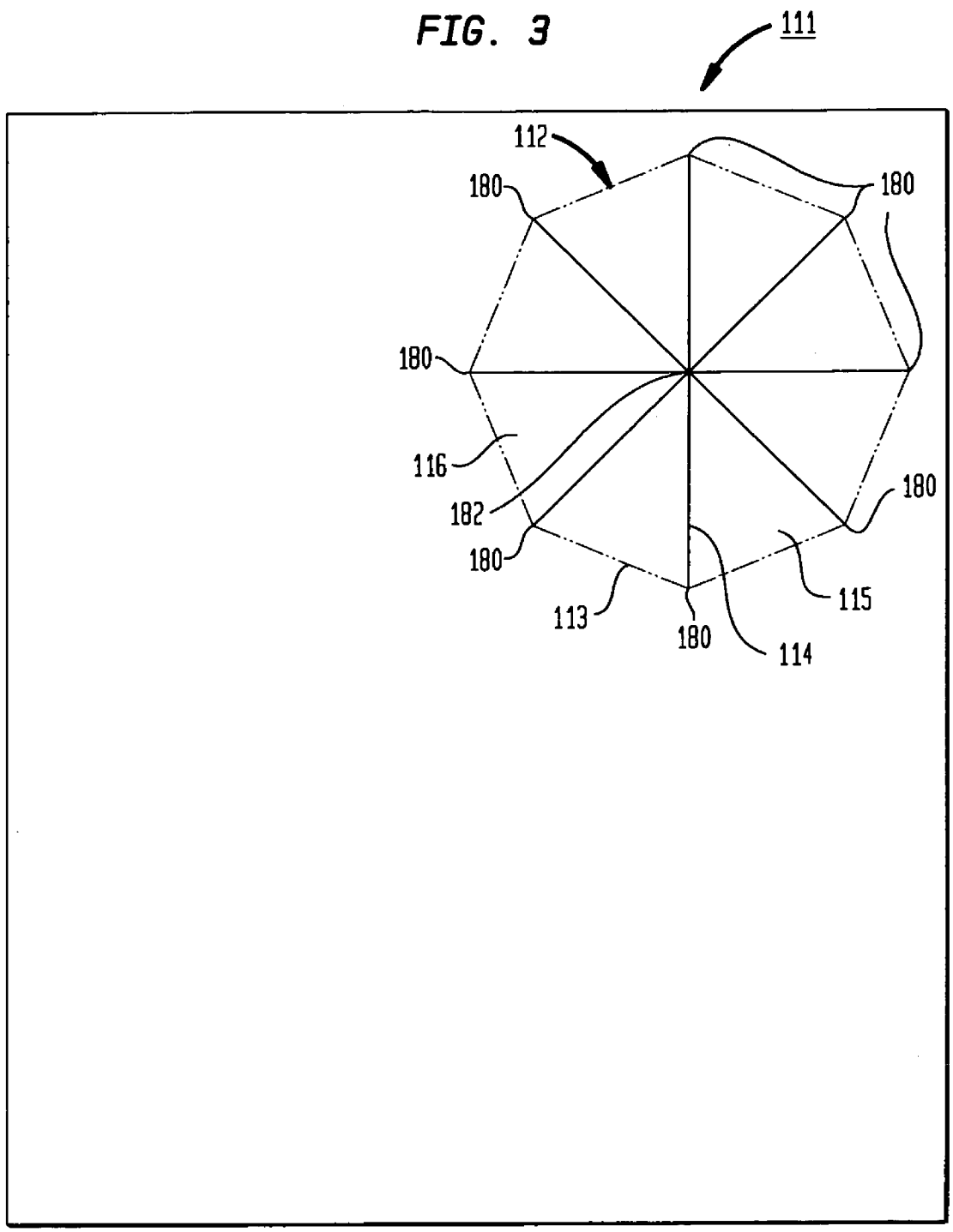
FIG. 3 is a plan view of an adjustable tray assembly according to one embodiment of the present invention.
Figure 6:
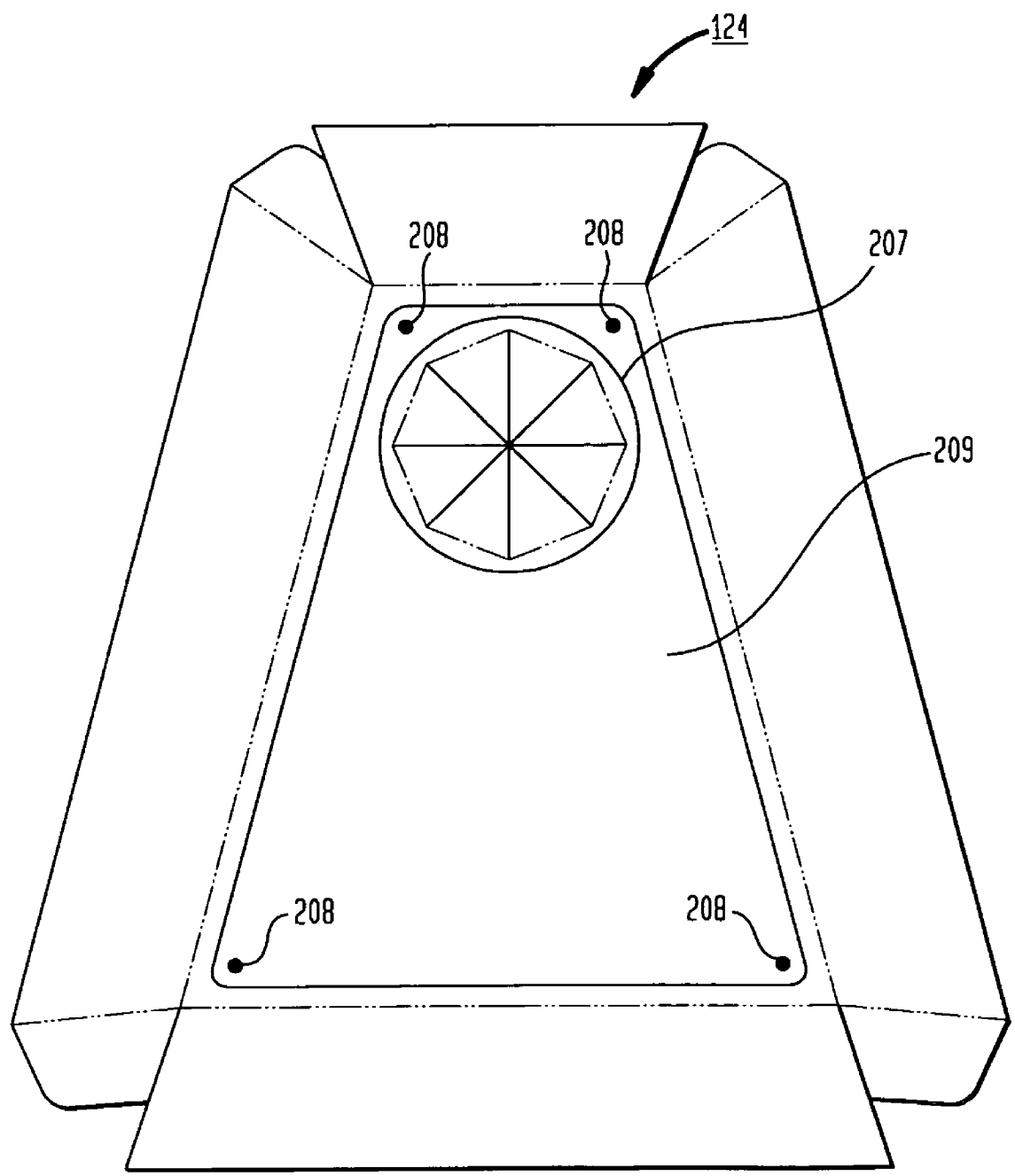
FIG. 6 is a plan view of an adjustable tray assembly with a trapezoidal shape, and showing a placemat affixed with anchoring barbs, according to one embodiment of the present invention.

FIG. 3 illustrates a flat rectangular tray 111 in accordance with an embodiment of the present invention. The tray 111 may also be made in different shapes, including a square, triangular, trapezoidal or oval shape. In FIG. 6, a trapezoidal shaped tray 124 is depicted. The tray 111 may be constructed of paperboard, a rigid plastic, or any other suitable material. The formation of an aperture 112 in the tray 111 is depicted in FIG. 3. In a preferred embodiment, the aperture 112 has a polygonal shape. The aperture 112 is constructed as follows: a plurality of scores 113 are etched in the tray 111 along the perimeter of the polygon area. A plurality of cuts 114 are made along straight lines from each apex 180 to the center 182 of the aperture 112. The scores 113 and cuts 114 define triangular shaped flaps 116, in the case where the aperture 112 is a polygon shape. The aperture 112 may be formed in a corner of the tray 111, as shown in FIG. 3, or may be formed at any other location, such as the center.

Figure 4:
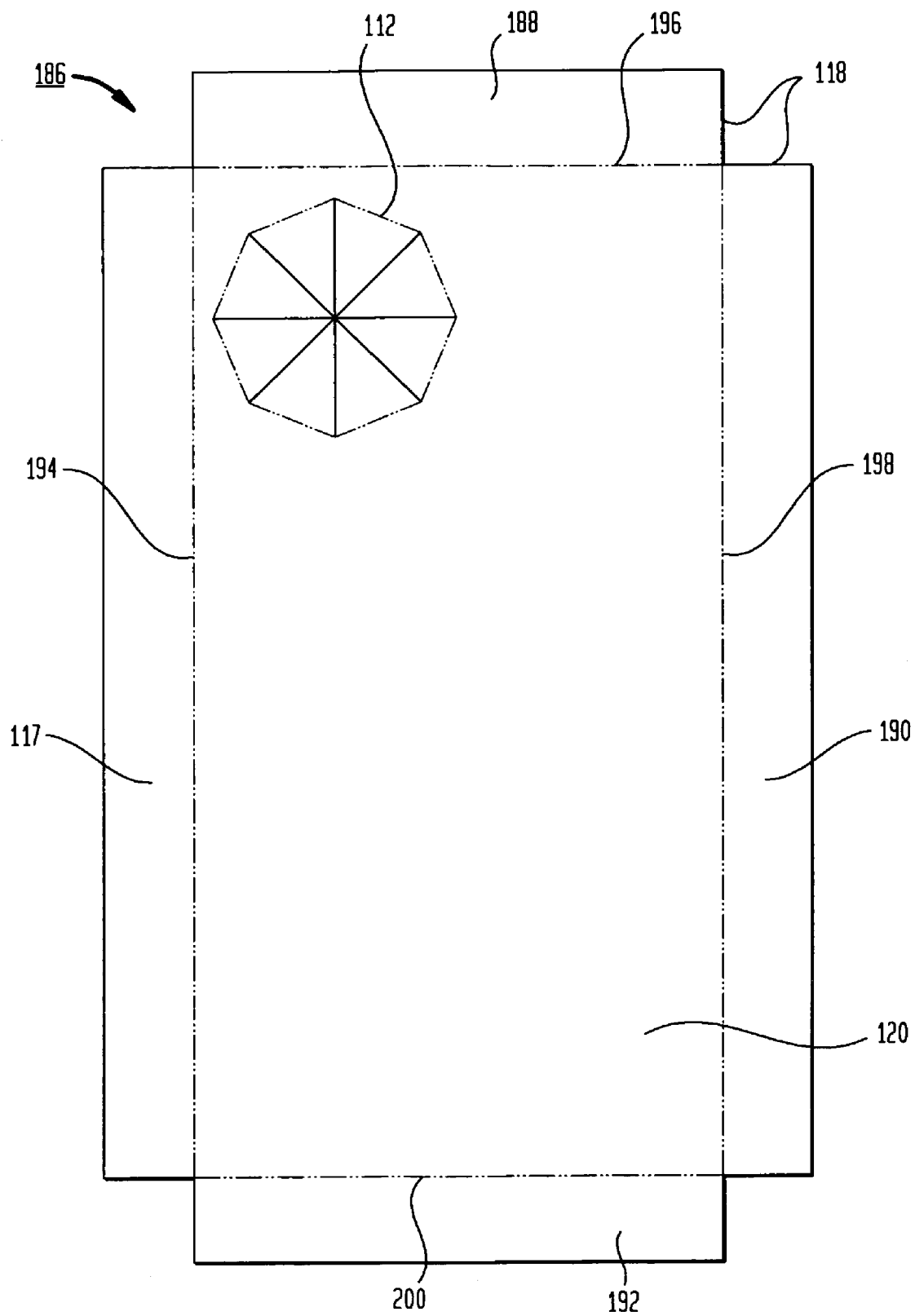
FIG. 4 is a plan view of an adjustable tray assembly with side rims according to one embodiment of the present invention.

FIG. 4 illustrates another embodiment of the tray assembly according to the present invention. In this embodiment, the tray 186 includes a polygon shaped aperture 112 as described above. The tray 186 also includes upwardly foldable side rims 117, 188, 190, 192 formed along the edges thereof. The side rims 117, 188, 190, 192 are formed by scores 194, 196, 198 200 formed along the perimeter of the area which defines the tray 186. In the embodiment illustrated in FIG. 4, the tray is rectangular, and the corners 118 are cut out, so that when the side rims 117, 188, 190, 192 are folded upward, there is no excess material at the corners. The rims 117, 188, 190, 192 are folded upward so as to contain the food items or other items placed on the tray 186, so the items do not fall off the tray 186.

Figure 5:
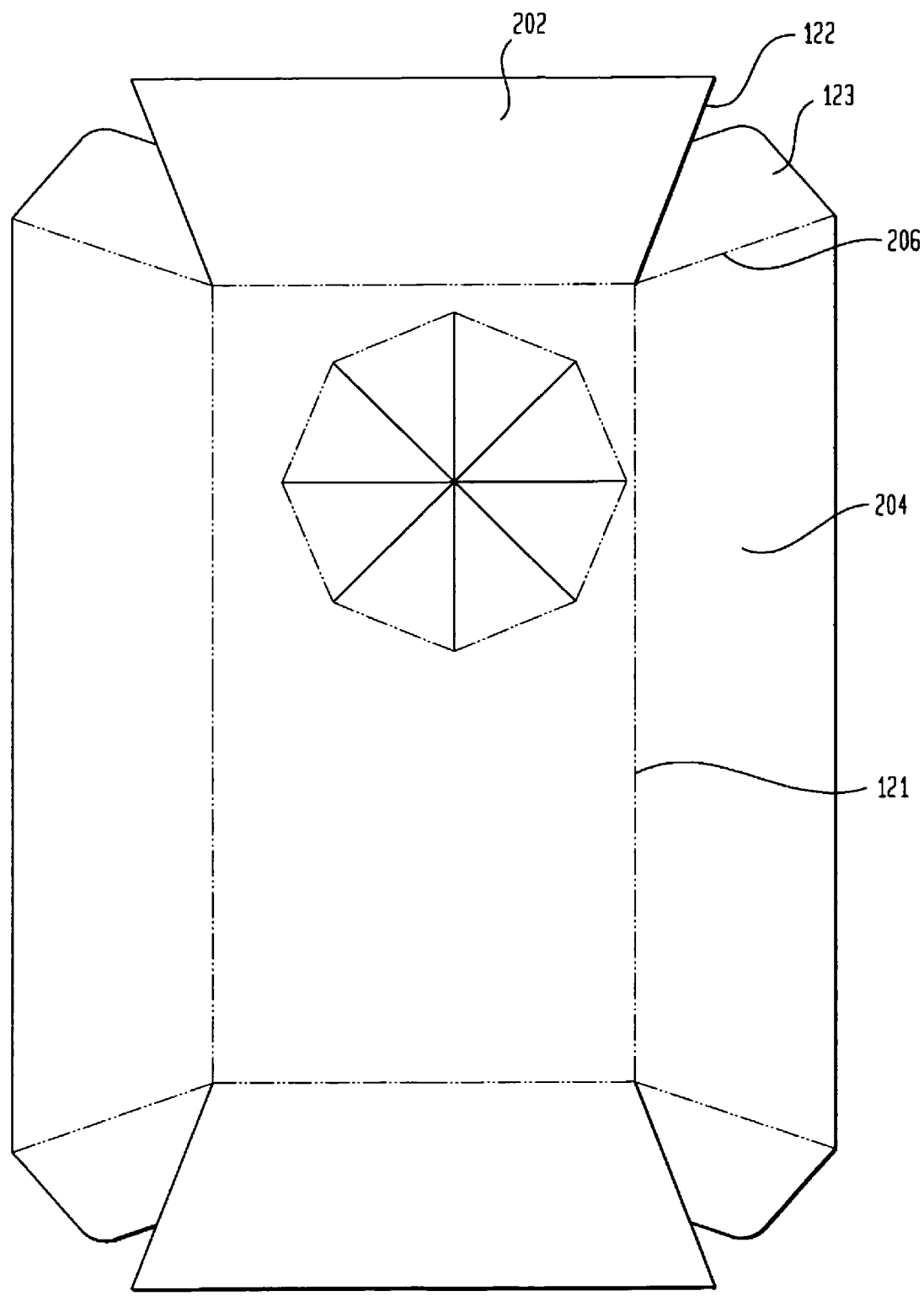
FIG. 5 is a plan view of an adjustable tray assembly with tabs to join the side rims according to one embodiment of the present invention.

Alternatively, the corners may include tray material which forms a joining tab 123 at the corners thereof, as shown in FIG. 5, which is used to attach one rim to an adjacent rim, for example, to attach rim 202 to rim 204. The joining tab 123 may be scored along one side 206, and the other side 122 may be cut so that it is separated from adjoining rim 202. According to the construction, the joining tab 123, which is an extension of the rim 204, may be folded along the score 206 and joined to the adjacent rim 202 by glue or other fastening means, including removable fastening means such as clips.

According to another feature of the present invention, as shown in FIG. 6, the adjustable tray assembly may include a disposable placemat 209 which may be removably attached to the upper surface of the tray 124. To hold the placemat 209 in place, the tray 124 may be fitted with one or more anchoring barbs 208 along a perimeter of the tray 124. The barbs 208 may be sharp, such as arrow-shaped barbs, so as to pierce the placemat 209 and hold it in place. Alternatively, the barbs 208 may be smooth and may mate with holes in the placemat 209 (not shown). In addition, the placemat 209 includes a hole 207 formed therethrough to coincide with the aperture of the tray. Although illustrated in FIG. 6 in conjunction with a trapezoidal tray 124, the placemat may be sized to conform to any shape tray.

Figure 7:
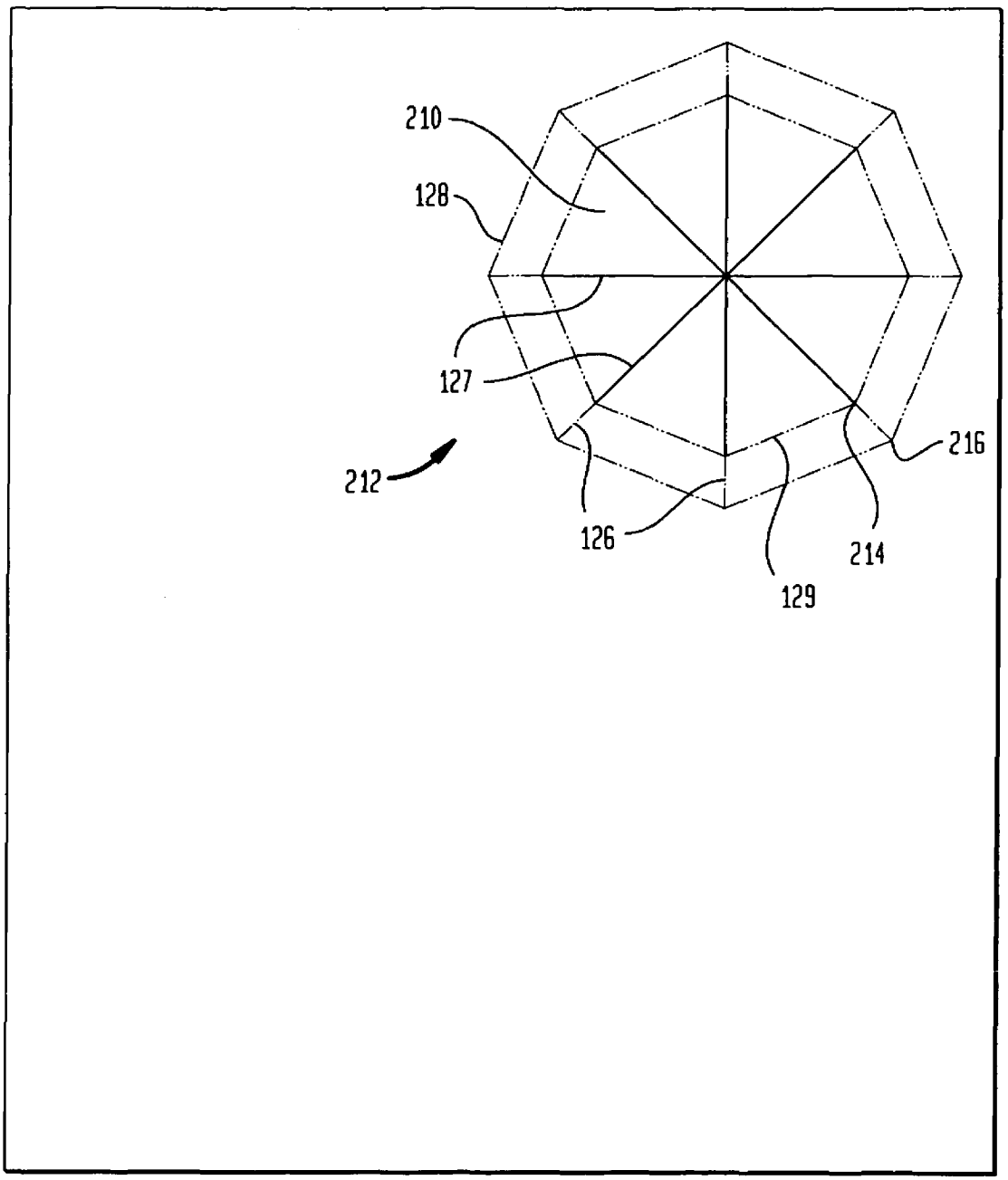
FIG. 7 is a plan view of an adjustable tray assembly with an adjustable aperture according to one embodiment of the present invention.

According to another embodiment of the present invention, as depicted in FIG. 7, each triangular flap 210 may include two scored lines 128, 129 so that the aperture 212 of the tray 125 is adjustable to accommodate different ranges of adapter diameters, as will be described in further detail below. The expandable aperture 212 includes cuts 127, similar to those described above in connection with FIG. 3. The cuts 127 extend from the center of the aperture 212 to the apexes of the inner polygon, which is defined by the inner scored lines 129. Each triangular flap, however, may be extended to the perimeter of the outer polygon, defined by the outer scored lines 128, by breaking through perforations 126 which extend from each inner apex, for example apex 214, to each corresponding outer apex, for example apex 216. According to this construction, the expandable aperture 212 will not open to its expanded size, i.e. as defined by the outer scored lines 128, unless the perforations are broken, and such expansion is desired, which will depend on the diameter of the inserted adapter at the aperture. The inner scores 129 may be deeper than the outer scores 128 so that more force is required to break the perforations and to bend the triangular flaps 210 along the outer polygon. This adaptability of the adjustable tray assembly allows the aperture to change its diameter in accordance with the diameter of the adapter at the point of abutment with the aperture of the tray 125, as will be better understood below in connection with the discussion of FIGS. 10A and 10B. Thus, the aperture is adjustable to the varying diameters within one or more adapters, because the diameter of the tapered adapter changes along its height, and also to varying diameters of differing adapters, because the tapered adapters may have differing overall sizes.

Figure 8:
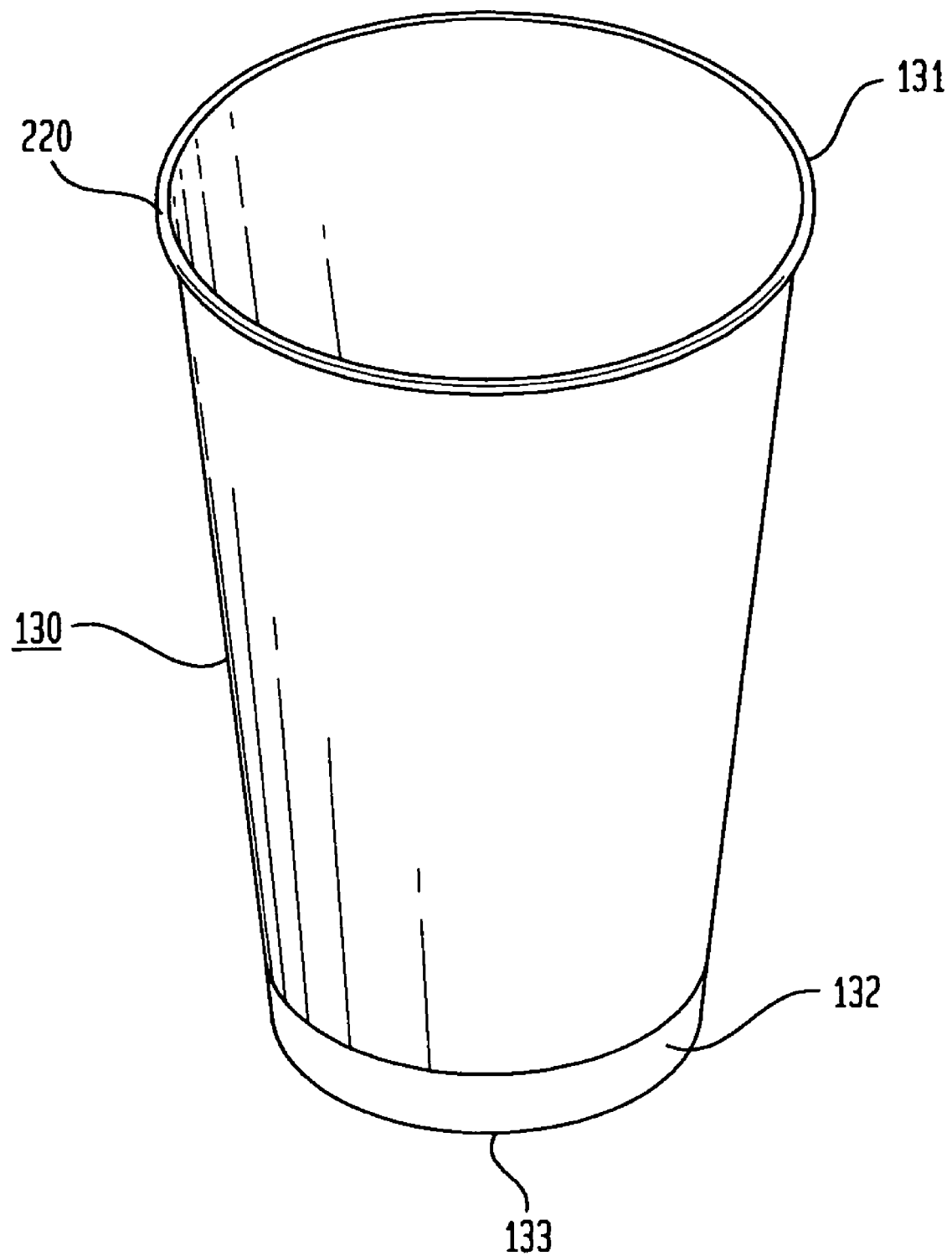
FIG. 8 is a perspective view of a tapered cylindrical frustum adapter according to an embodiment of the present invention.

FIG. 8 illustrates a hollow, cylindrical frustum adapter 130 according to an embodiment of the present invention. As shown, the adapter 130 has a tapered shape, including a wider open upper end 131 and a narrower lower end 133, which may be closed. The tapered shape of the adapter 130 is intended to generally conform to the tapered shapes of various drinking cups available on the market. Although the adapter 130 has a tapered shape, it may accommodate a variety of shapes of beverage containers, including cylindrical containers, water bottles, and soda cans and bottles, for example. The upper end 131 may include a beaded edge 220, which will strengthen the opening. In addition, the lower end 133 may include a crimped skirt 132, which is a construction well known to one of ordinary skill in the art, and which aids in the retention of the overall shape of the adapter 130, and also strengthens the lower end 133 for improved insertion/removal of the adapter 130 from the aperture of the tray assembly. In particular, a strengthened lower end 133 facilitates the downward bending of the triangular flaps 116 or 210, described above, and the tearing of the perforations 126, as needed.

Figure 9:
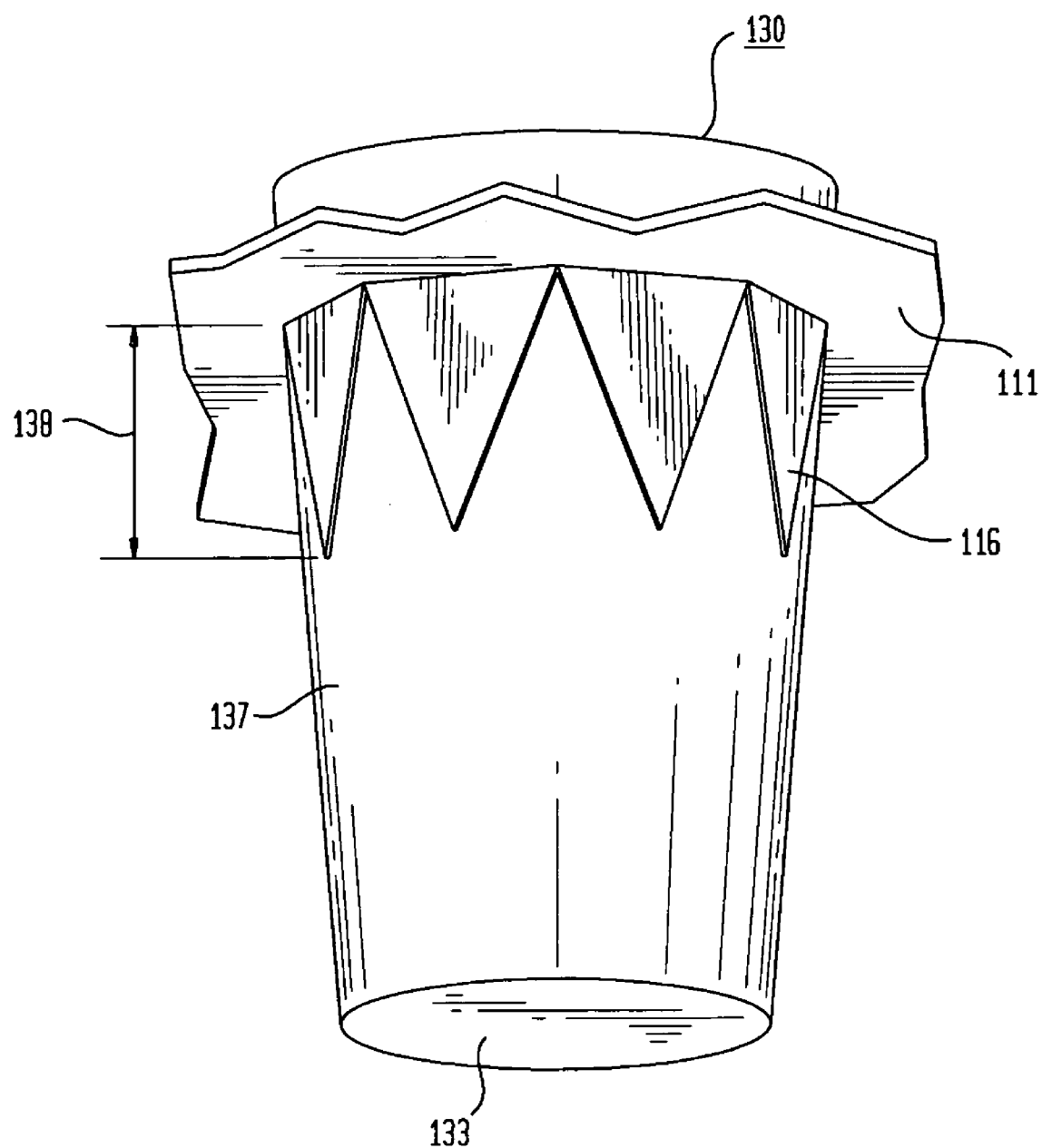
FIG. 9 is a perspective view of a frustum adapter inserted in the aperture of a tray according to an embodiment of the present invention.

FIG. 9 is a perspective view showing the cylindrical frustum adapter 130 removably inserted in the aperture 112 of the tray 111 (shown in FIG. 3). When a user assembles the tray assembly, the user positions the aperture 112 of the tray 111 over the cupholder, and inserts the adapter 130 into the aperture 112, thereby causing the triangular flaps 116 to fold downward along the scores 113 (shown in FIG. 3), and the aperture 112 opens accordingly without the necessity for costly scrap removal, and allows the adapter 130 to pass into the cupholder. The flaps 116 engage in frictional contact with the outer surface 137 of the adapter wall. This frictional contact may enable the tray 111 to be supported above the cupholder, as more clearly shown in FIG. 10B, under certain circumstances. The frictional contact with the flaps 116 significantly improves the ability of the frustum adapter 130 to support the tray 111, as compared to insertion of the adapter 130 into an aperture with no flaps. This advantage is owing, at least in part, to the increased surface area of contact, i.e. friction, between the tray 111 and the adapter 130, that the flaps 116 provide. According to a preferred embodiment of the present invention, the contact surface of the flaps 116 is uncoated and uncalendered so as to provide a rougher surface to maximize friction with the adapter 130. In addition, the outer surface of the adapter 130 may be uncoated and uncalendered to likewise maximize friction.

Figure 13:
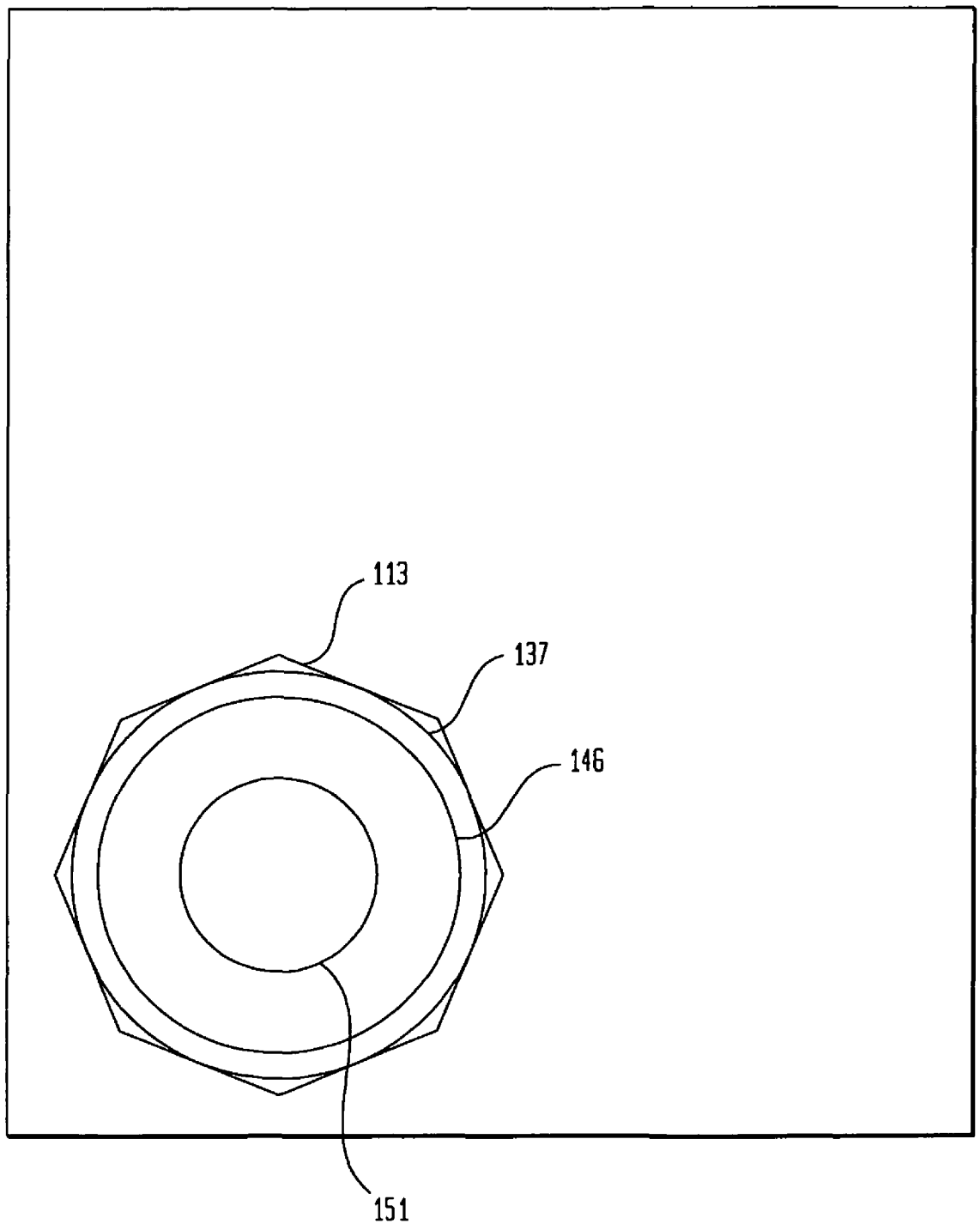
FIG. 13 is a top view of the adjustable tray assembly depicted in FIG. 11.

When the adapter 130 is inserted in the aperture 112 of the tray 111, the outer surface 137 of the adapter wall may abut the scores 113 of the aperture 112, as depicted in FIG. 3, for example, in which case the triangular flaps 116 will fold down, as shown in FIG. 9. The distance 138 defines the length of the triangular flaps 116. According to a preferred embodiment, the rim 135 of the cupholder 101 engages the tray assembly at a point within the distance 138 so as to abut the downwardly folded triangular flaps 116, as will be described in connection with FIGS. 10A and 10B. The adapter 130 is hollow so as to receive a removably inserted beverage container 146, as shown in FIG. 11. FIG. 13 shows a top view of a beverage container 146, which has a smaller diameter 151 at a lower end thereof, inserted in the adapter. As can be seen, the outer surface 137 of the adapter wall abuts the scores 113 of the aperture 112 of the tray 111.

It is well known that there are different sized cupholders in different vehicles. In addition, according to the present invention, there are different size adapters which may be used in the tray assembly. As described above, the adapter has a downwardly tapered shape, so that a diameter at one point along the length of the adapter is always greater than a diameter at a lower point. Accordingly, a variety of fits between the various components of the tray assembly is possible.

Figure 10A:
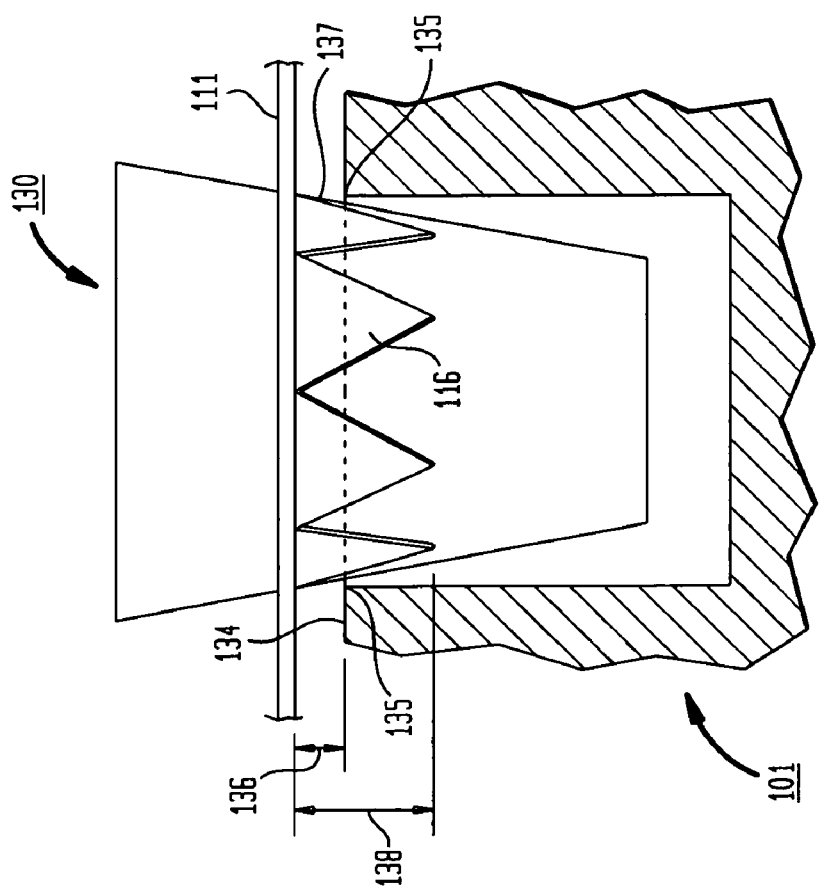
FIG. 10A is a partial cross-sectional side view of an adjustable tray assembly according to an embodiment of the present invention, where the adapter is inserted in the aperture and the diameter of the aperture approximately equals or is equal to the diameter of the cupholder.
Figure 10B:
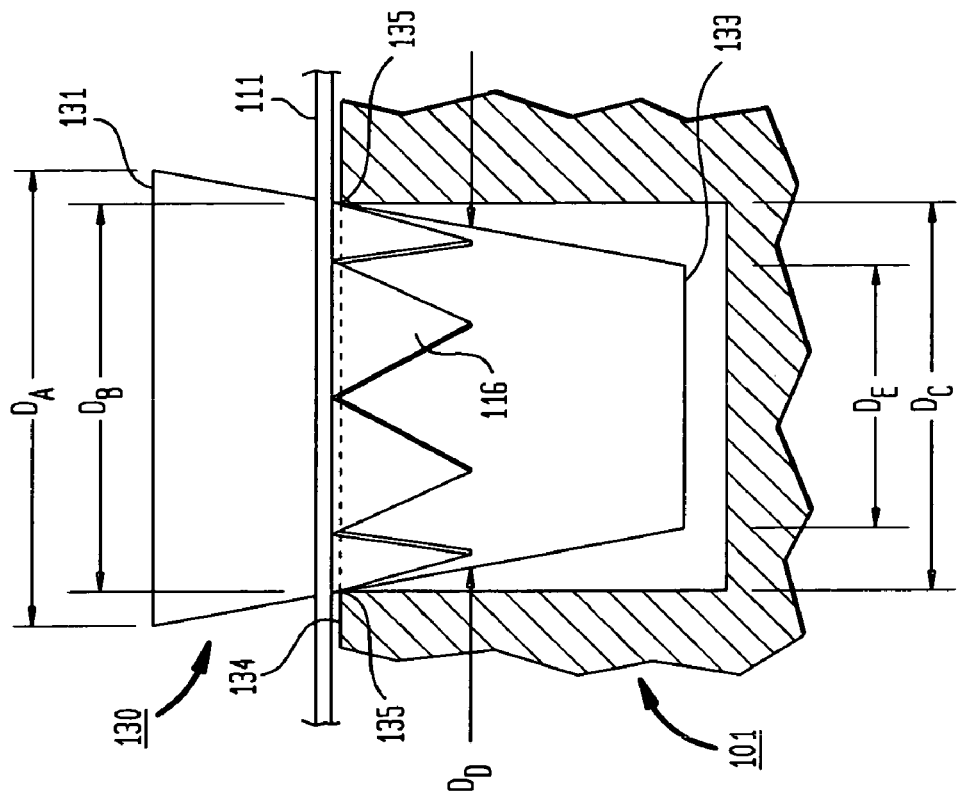
FIG. 10B is a partial cross-sectional side view of an adjustable tray assembly according to an embodiment of the present invention, where the adapter is inserted in the aperture and the diameter of the aperture is greater than the diameter of the cupholder.
Figure 11:
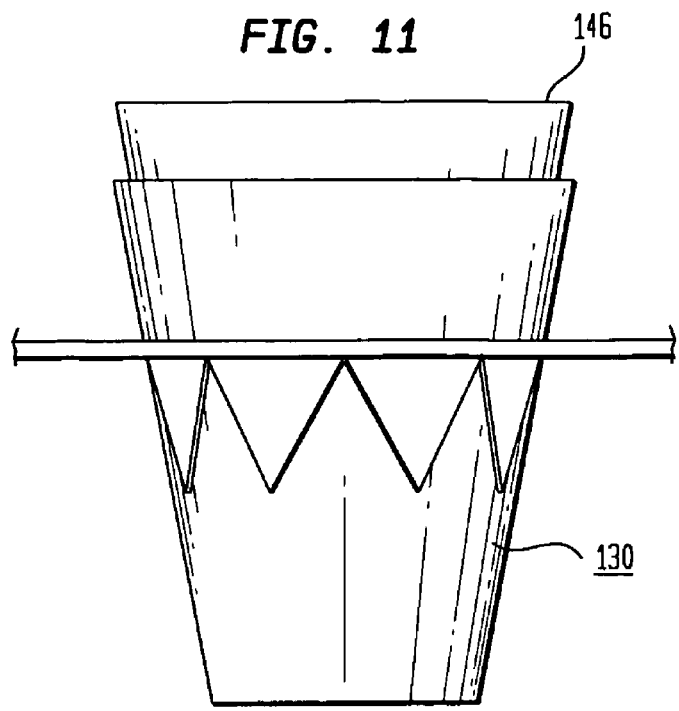
FIG. 11 is a side view of an adjustable tray assembly with a beverage container inserted, according to one aspect of the present invention.
Figure 12:
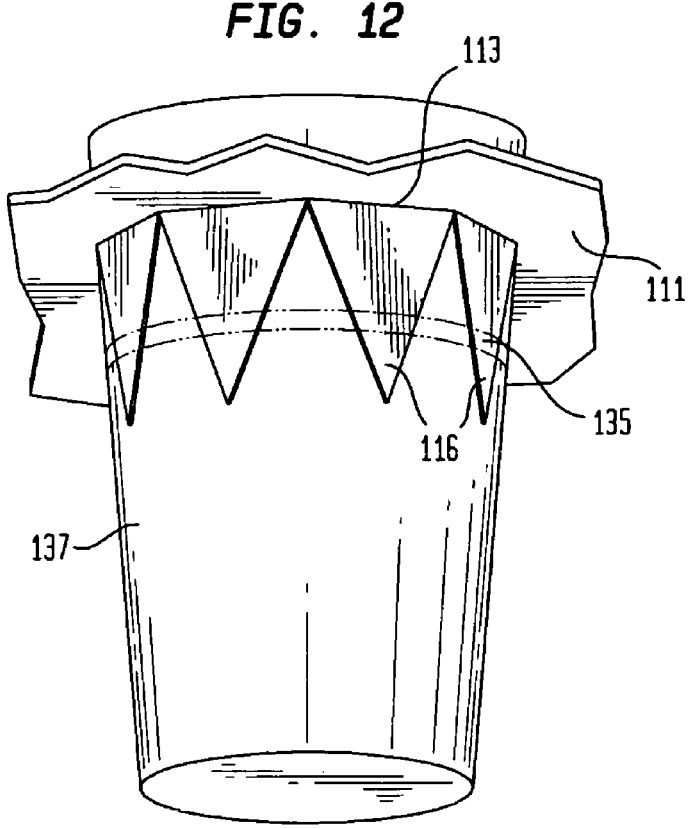
FIG. 12 is a perspective view of a frustum adapter inserted in the aperture of a tray according to another embodiment of the present invention.

There are several diameters which will be discussed in connection with the variety of fits between cupholder, tray assembly and beverage container, as shown in FIGS. 10A and 10B. The diameter of the adapter 130 at its upper opening 131 is represented by $D_A$. The "diameter" of the aperture 112 is represented by $D_B$. In an embodiment where the aperture 112 is not circular, such as a polygon, the diameter $D_B$ refers to the diameter of the largest circle which fits within the boundaries of the aperture 112. The diameter of the cupholder is represented by $D_C$. In the case of a tapered cupholder, the diameter $D_C$ would be the diameter at the uppermost edge, illustrated by ring 135 in FIG. 12. The diameter of the adapter 130 at the bottom tips of the downwardly extended triangular flaps 116 is represented by $D_D$. And the diameter of the adapter 130 at the lower end 133 is represented by $D_E$. According to the present invention, $$D_A \geq D_B \geq D_C > D_D > D_E$$

Other relative diameters, however, are within the scope of the invention. Thus, the diameter $D_B$ of the aperture 112 must be greater than or equal to minimum diameter $D_E$ of the adapter 130, and the maximum diameter $D_A$ of the adapter 130 must be greater than or equal to the diameter $D_B$ of the aperture 112. The diameter of the aperture $D_B$ may be equal to the diameter of the cupholder $D_C$, so that the tray 111 is supported on an upper surface 134 of the cupholder 101, as shown in FIG. 10A. If the cupholder is the dashboard type, and does not have a bottom, under the foregoing circumstance, the tray assembly will be inserted until the dashboard cupholder abuts the tray itself. According to the present invention, however, the diameter of the aperture $D_B$ is never less than the diameter of the cupholder $D_C$. If the diameter of the aperture $D_B$ were less than the diameter of the cupholder $D_C$, the tray would not be held in place, and would slip and slide because of the gap (not shown) which would remain between the aperture and the sides of the adapter.

According to a preferred embodiment, the diameter of the aperture $D_B$ may be greater than the diameter of the cupholder $D_C$, so that the tray 111 is supported above the cupholder 101 by the triangular flaps 116, as shown in FIG. 10B. When the diameter of the cupholder $D_C$ falls within the distance 138, which is the length of the flaps 116, the rim 135 of the cupholder 101 (illustrated as ring 135 in FIG. 12) further abuts the triangular flaps 116, so as to press the triangular flaps 116 against the outer surface 137 of the adapter 130 to support the tray 111 above the cupholder 101. The distance 136 indicates the distance between the tray 111 and the upper surface 134 of the cupholder 101. According to the present invention, this construction allows the tray 111 to be supported in a plane spaced from and above the cupholder, which may also avoid unnecessary conflicts with other items in the vehicle which are located in the vicinity of the cupholder, such as the gearshift.

Figure 14:
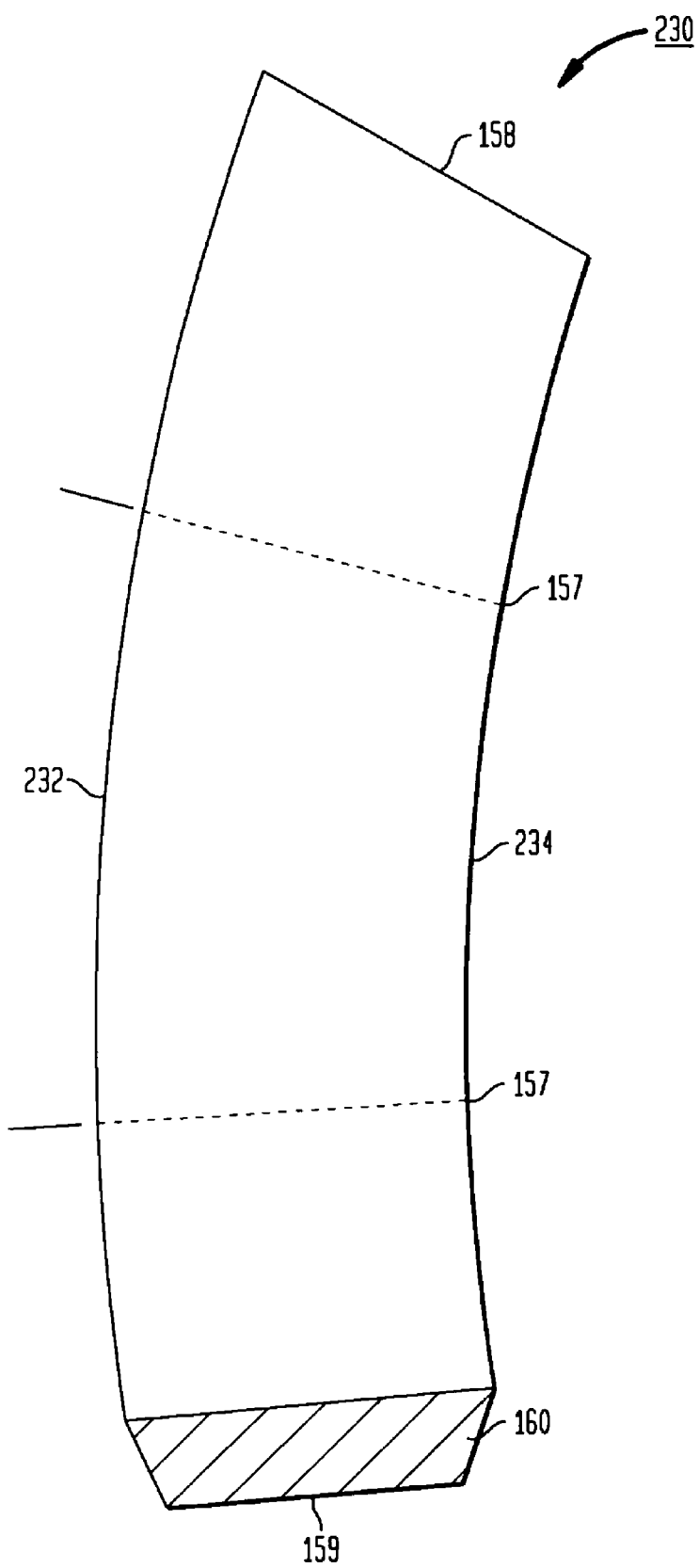
FIG. 14 is a plan view of an unassembled adapter, according to one aspect of the present invention.

The adapter 130 may have a variety of configurations to adapt to different size cupholders, for example. In addition, the adapter 130 may be pre-formed as a tapered cylindrical frustum from plastic, which may be molded, extruded or thermoformed, for example, or, alternatively, the adapter 230 may be a flat, unassembled piece of paperboard, for example, as shown in FIG. 14, which is later assembled. According to this embodiment, which is similar to a bottomless paper cup or an insulating sleeve for a hot paper cup (such as a coffee cup) when fully laid out flat, the adapter 230 has a convex shaped upper edge 232 and a concave shaped lower end 234. The adapter 230 may have transverse scoring 157, to facilitate in the folding of the material into a cylindrical shape. The ends 158, 159 of the adapter 230 may be arranged in an overlapping fashion, with one end attached to the other by glue or any other fastening means to maintain the adapter 230 in a cylindrical shape. As shown in FIG. 14, the area 160 may mark the overlapping area where glue or another adhesive is applied to join the ends 158, 159.

Figure 15:
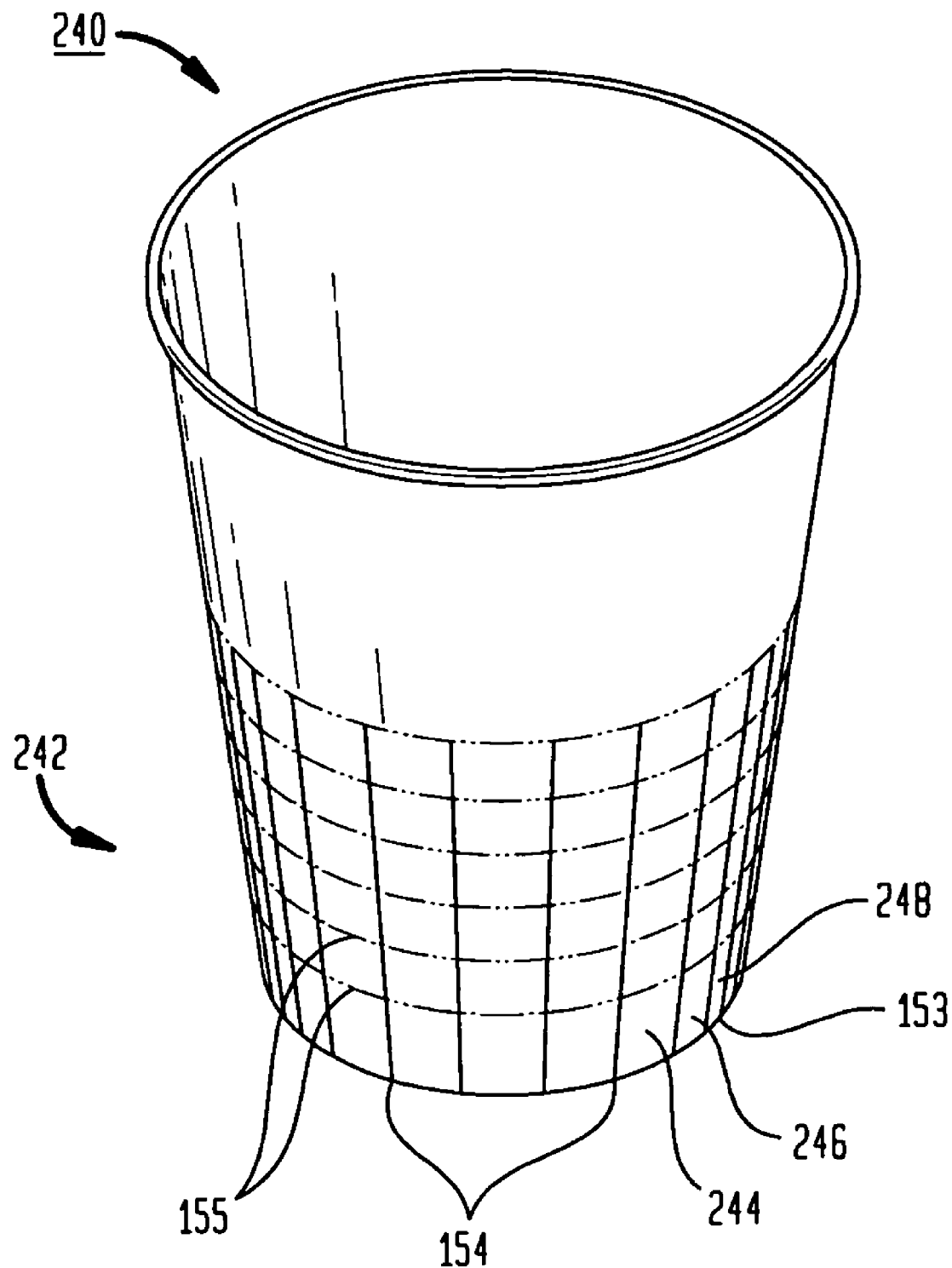
FIG. 15 is perspective view of an adjustable adapter with vertical cuts and horizontal scoring encircling lower wall, according to an embodiment of the present invention.
Figure 15A:
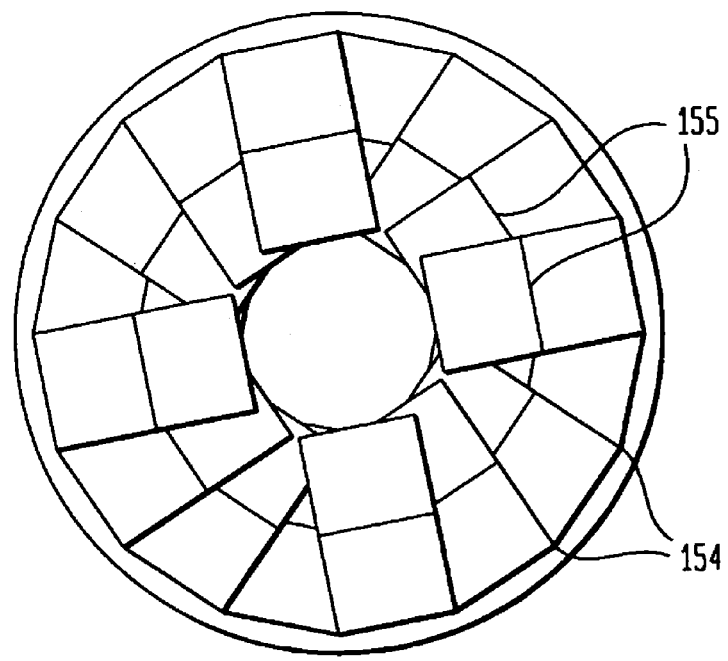
FIG. 15A is a bottom view of the adapter of FIG. 15, showing the lower wall folded inward.
Figure 15B:
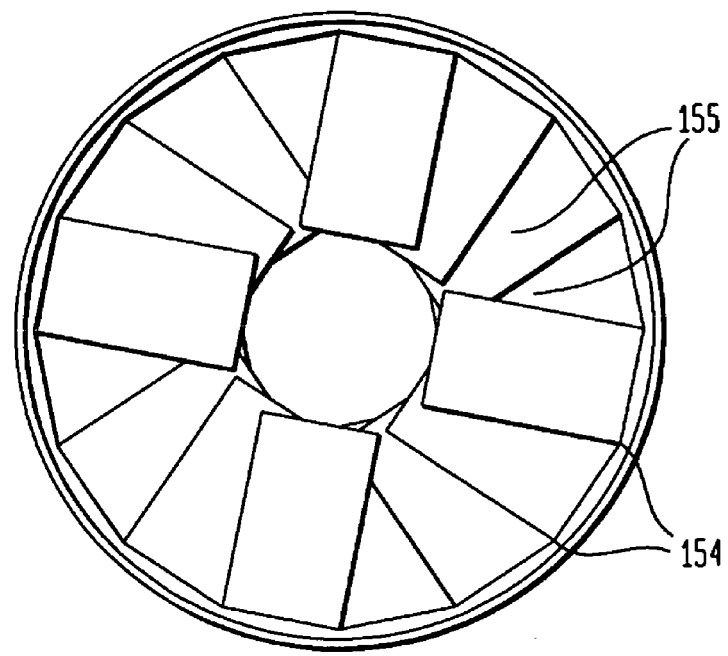
FIG. 15B is a top view of the adapter of FIG. 15, showing the lower wall folded inward.

According to various embodiments of the present invention, it also is possible that a user will desire an adapter 240 with a variety of selectable heights to adapt to varying depths of well-type cupholders, as shown in FIG. 15. Equipped with this feature, the height of the adapter 240 may be modified so that the rim of the cupholder abuts the adapter 240 at a location corresponding to the downward triangular flaps, as described above in connection with FIG. 12. As shown in FIG. 15, the bottom 153 of adapter 240 is open, and the lower section 242 of the adapter 240 is configured with a series of vertical cuts 154 which define vertical strips 244, 246, 248 etc., which are provided with horizontal scoring 155 at fixed spaced intervals throughout the circumference of the adapter 240. The lower section 242 may comprise the lower half of the cylindrical adapter 240, or any other portion. To vary the height of the adapter 240, the vertical strips 244, 246, 248 etc. of the adapter may be folded inward by downward pressure against the enclosed bottom of a well-type cupholder along a selected score line 155, as shown in FIGS. 15A and 15B.

Figure 16A:
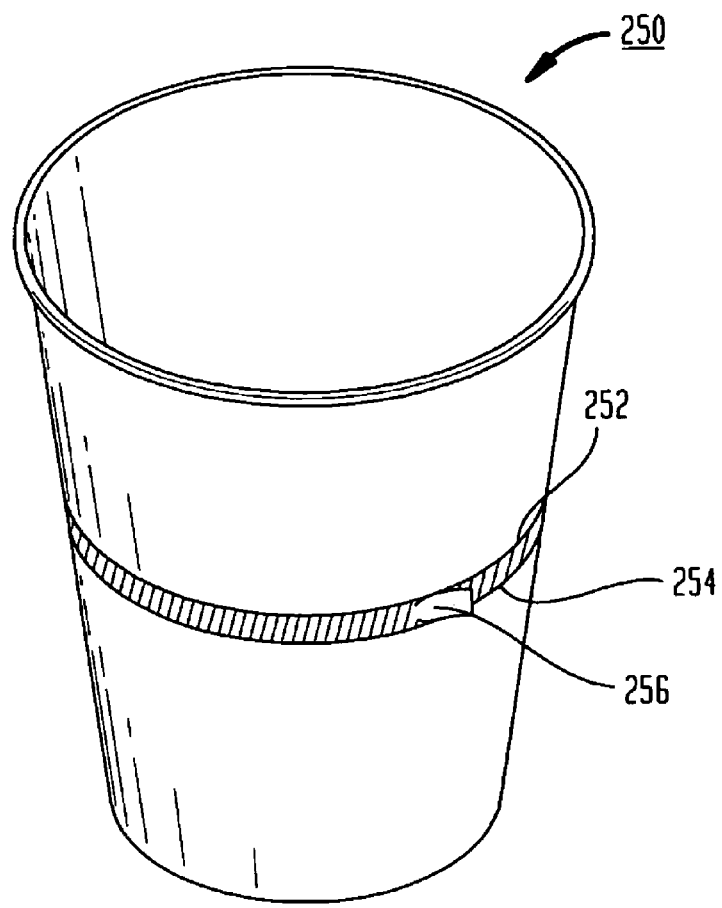
FIG. 16A is perspective view of an adjustable adapter with a pull tab, according to an embodiment of the present invention.
Figure 16B:
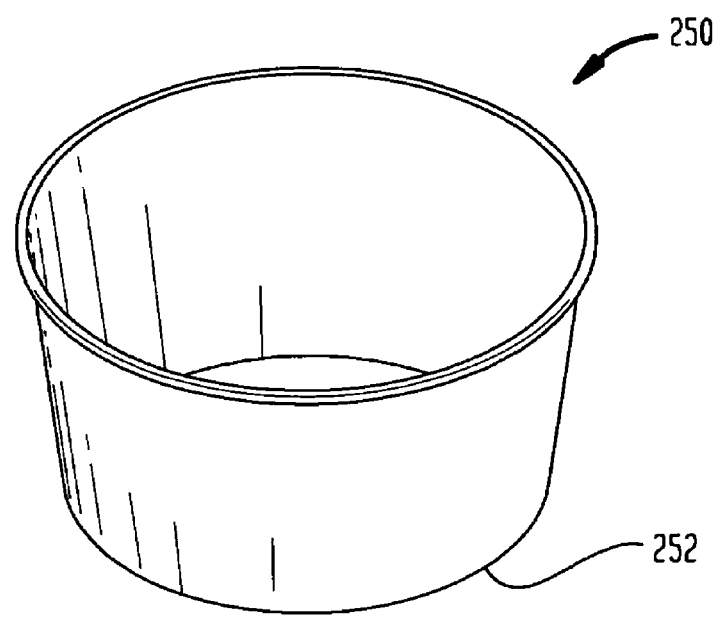
FIG. 16B is a perspective view of the adjustable adapter of FIG. 16A after the tab has been pulled.

The present invention further contemplates alternate constructions for providing adapters with varying heights. In FIGS. 16A and 16B, one such alternate arrangement is illustrated, wherein the adapter 250 is provided with two perforated lines 252, 254 encircling the circumference of the adapter 250. If the perforations 252, 254 are not broken, the adapter 250 maintains its original height. If, however, a smaller height is desired so as to accommodate a shallower well, a user may pull a tab 256, which will activate the tearing of the perforations 252, 254, so as to reduce the height of the adapter 250, as illustrated in FIG. 16B.

Figure 17:
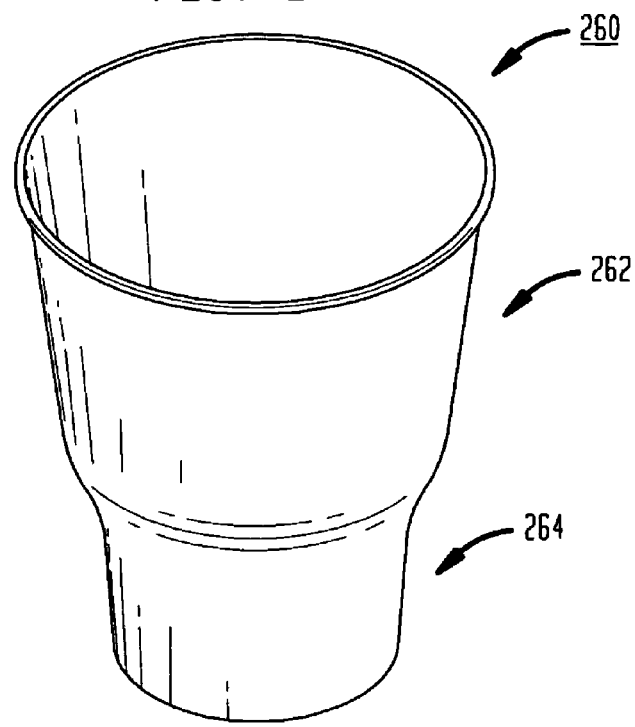
FIG. 17 is a perspective view of a two-tiered adapter, according to one embodiment of the present invention.

It may also be desirable to have an adapter 260 with a stepped-down diameter, rather than a gradually tapered shape to obtain a wider diameter range in less height, as shown in FIG. 17. According to this embodiment, the adapter 260 may have a first diameter in an upper section 262 which is much larger than the diameter of the lower section 264. The diameter of the lower section 264 may closely approximate the diameter of a disc cupholder (which is generally narrower than a well-type cupholder), whereas the diameter of the upper section 262 may be much larger so as to accommodate a significantly wider well-type cupholder. The transition between the upper section and lower section is rapid and severe, as compared to a gradual taper, as illustrated in FIG. 17. An adapter 260 constructed in accordance with this embodiment may have a diameter of 2.5 inches for the lower section 264, and a diameter of 3.25 inches for the upper section 262. In addition, the lower section 264 may have a height of 2 inches to fit in very shallow (e.g. 2 inch deep) wells. According to this embodiment, the adapter has two sections: an upper section 262 with a wider diameter, and a lower section 264 with a narrower diameter. In another embodiment, the adapter may have one or more intermediate sections disposed between the upper section 262 and the lower section 264. The one or more intermediate sections (not shown) may have a diameter less than the section above it, and greater than the section below it, so that the diameters of the adapter are downwardly decreasing from the largest diameter at the upper end to the smallest diameter at the lower end. According to this embodiment, the diameter decrease between each adjacent section is severe (not gradual), similar to that shown in FIG. 17.

Figure 18:
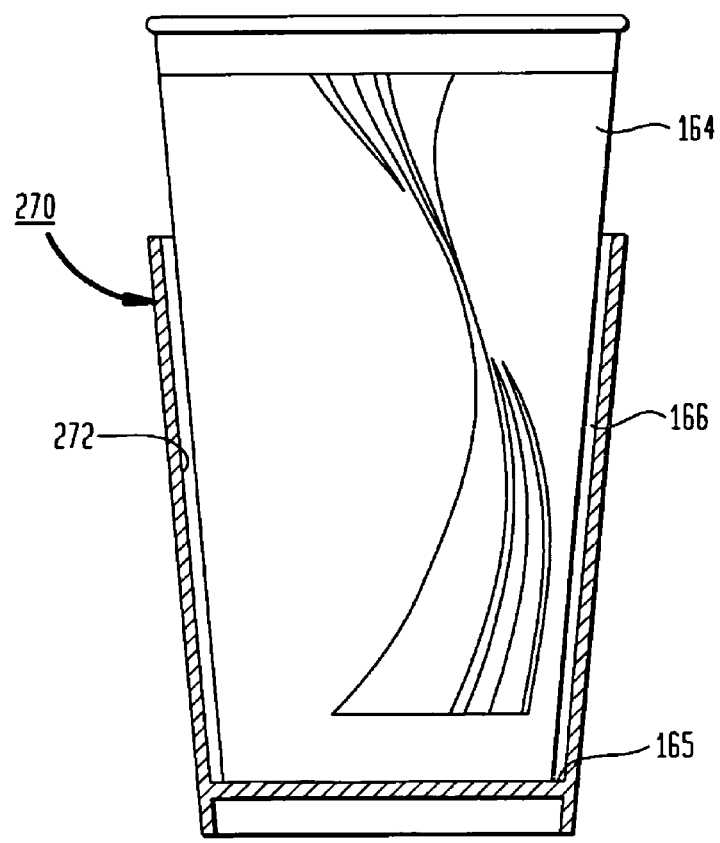
FIG. 18 is a partial cross-sectional view of an adapter separated by a gap from an inserted beverage container, according to an aspect of the present invention.

According to one embodiment of the present invention, the adapter 270 is dimensioned in accordance with well-known dimensions of typical beverage containers, so that an inserted beverage container 164 does not abut the inner walls 272 of the adapter 270, as shown in FIG. 18. According to this embodiment, when the beverage container 164 is inserted in the adapter 270, the lower end 165 of the beverage container 164 rests on the bottom of the adapter 270, but the outer walls of the beverage container 164 do not abut the inner walls 272 of the adapter 270. A gap 166 remains between the beverage container 164 and the adapter 270 so that the beverage container 164 does not become stuck or lodged in the adapter 270. In addition, the inner walls 272 of the adapter 270 may be coated so as to decrease friction in the event that the inserted beverage container 164 is larger than a typical beverage container and comes into contact with the inner walls 272. This arrangement facilitates easy insertion and removal of the beverage container 164 to/from the adapter 270 so as to avoid, for example, spills.

According to the present invention, the adapter 270 may be inserted in the cupholder for easily removably holding beverage containers, with or without the tray, so as to take advantage of the no-stick feature described above.

Figure 19:
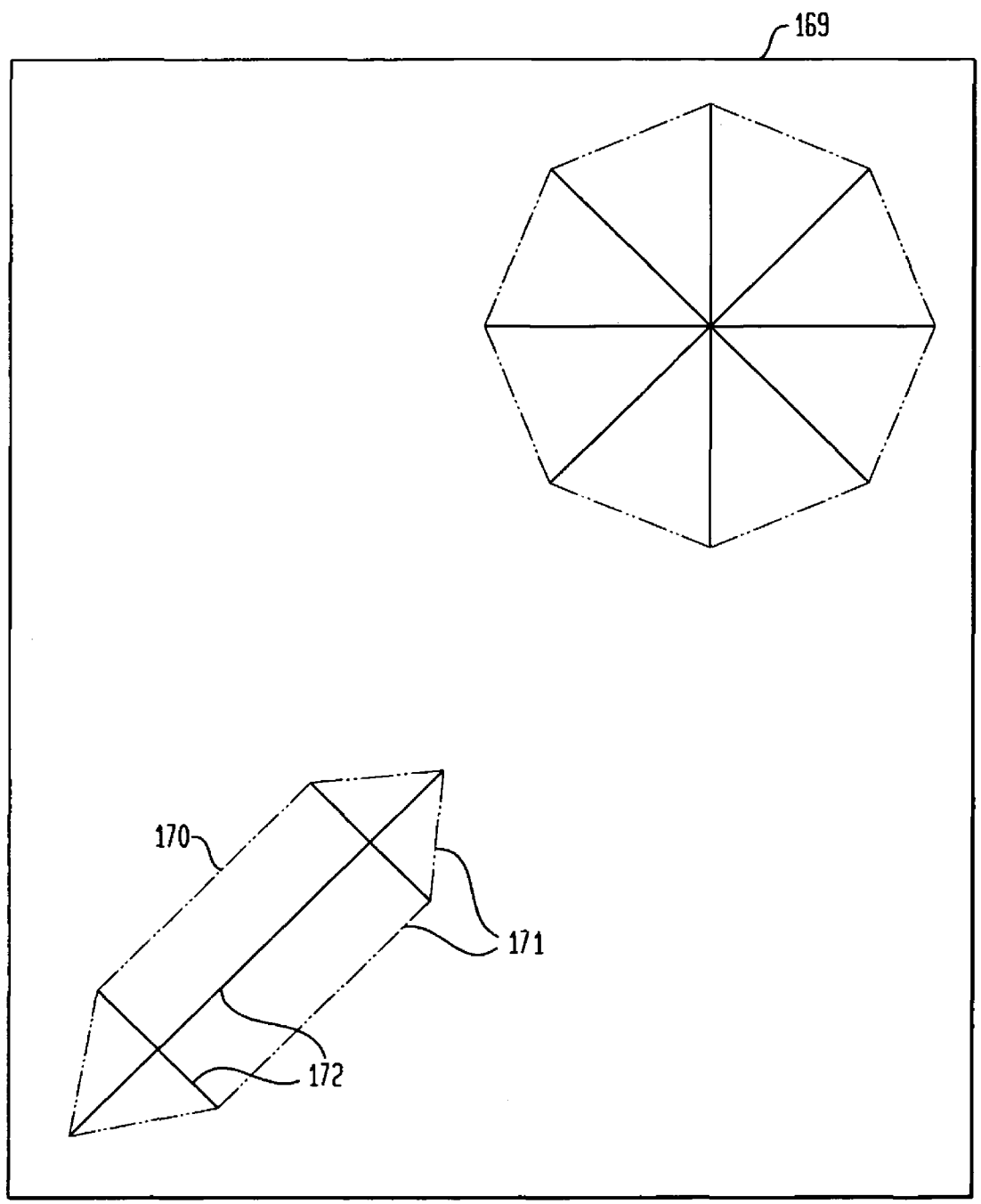
FIG. 19 is a top view of a flat tray with a second aperture for removably receiving a second container, according to one embodiment of the present invention.

It also may be desirable to provide the tray as described herein with the ability to hold food items or other items in additional apertures. In accordance with this aspect of the invention, a tray 169 may be provided with a second aperture 170 (or more) combining a scored outer perimeter 171 with inner cuts of perforations 172 as shown in FIG. 19. When the perforations 172 are pushed open, the second aperture 170 is formed. The shape of the second aperture 170 may be generally rectangular to as to accommodate food items or other items in rectangular, tapered containers, such as for French fries or the like.

According to the above embodiments, an adjustable tray assembly is provided which is inexpensive to manufacture, which may be reusable in different vehicles and with food or other items purchased from a variety of establishments, and which can easily and readily be assembled and disassembled by user.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. An assembly for releasably affixing a conveying accessory to an open socket formed in or as part of a supportive console, the assembly comprising;
a panel configured to enable an opening therethrough immediately above and aligned with but not part of a structure defining the open console socket;
a plurality of flaps scribed in a surface of said panel to have a common fold line boundary outlining said opening, said flaps being downwardly foldable along said fold line boundary by an adapter to depend below said panel and to define an aperture having a variable effective diameter through said panel to enable said adapter and flaps to fit within any of a plurality of open console sockets the diameters of which are within a range of from less than to approximately equal to said opening defined by said common fold line boundary, said flaps being releasably secured by said adapter to a perimeter of the open console socket whereby said flaps provide the principal structural support to counteract destabilizing forces tending to disorient said panel relative to said console socket.

2. The assembly as set forth in claim 1 wherein the adapter includes a plurality of strips formed in a section thereof by a plurality of vertical cuts extending from a bottom edge of the adapter and a plurality of horizontal scores, so that a vertical height of the adapter can be adjusted by bending the plurality of strips toward the center of the adapter.

3. The assembly as set forth in claim 1 wherein the outer sidewalls of the adapter are uncoated and uncalendered so as to maximize friction with the depending flaps.

4. The assembly as set forth in claim 1 wherein the inner surfaces of the depending flaps are uncoated and uncalendered so as to maximize friction with the adapter.

5. The assembly as set forth in claim 1 in which the conveying accessory is supported in a plane substantially parallel to and at or vertically displaced from a plane defined by a peripheral edge of an open portion of the console socket.

6. The assembly of claim 1 in which said adapter comprises a hollow cup-like form configured to hold a beverage container.

7. The assembly of claim 1 in which the variable effective diameter of said aperture is selected to fit a group of console sockets with differing diameters less than or equal to the diameter of said opening in said panel.

8. The assembly of claim 7 in which said adapter comprises an inverse frustum form, a portion of said inverse frustum form being configured to pass through, and to expand, said variable effective diameter of said aperture, said group of sockets having diameters within the range of from approximately 2.5 to approximately 3.5 inches.

9. The assembly as set forth in claim 8 wherein said adapter has an upper portion a middle portion, and a bottom portion, the diameter of the upper portion being greater than the diameter of the middle portion, and the diameter of the middle portion being greater than the diameter of the bottom portion, whereby said adapter fits differing diameter console sockets.

10. The assembly of claim 8 in which the diameter of a portion of said adapter is larger than the largest effective variable diameter opening defined by said flaps.

11. The assembly of claim 10 in which said adapter is a frustum of a conical configuration.

* * * * *